June 24, 1930. G. CASSADY 1,767,276

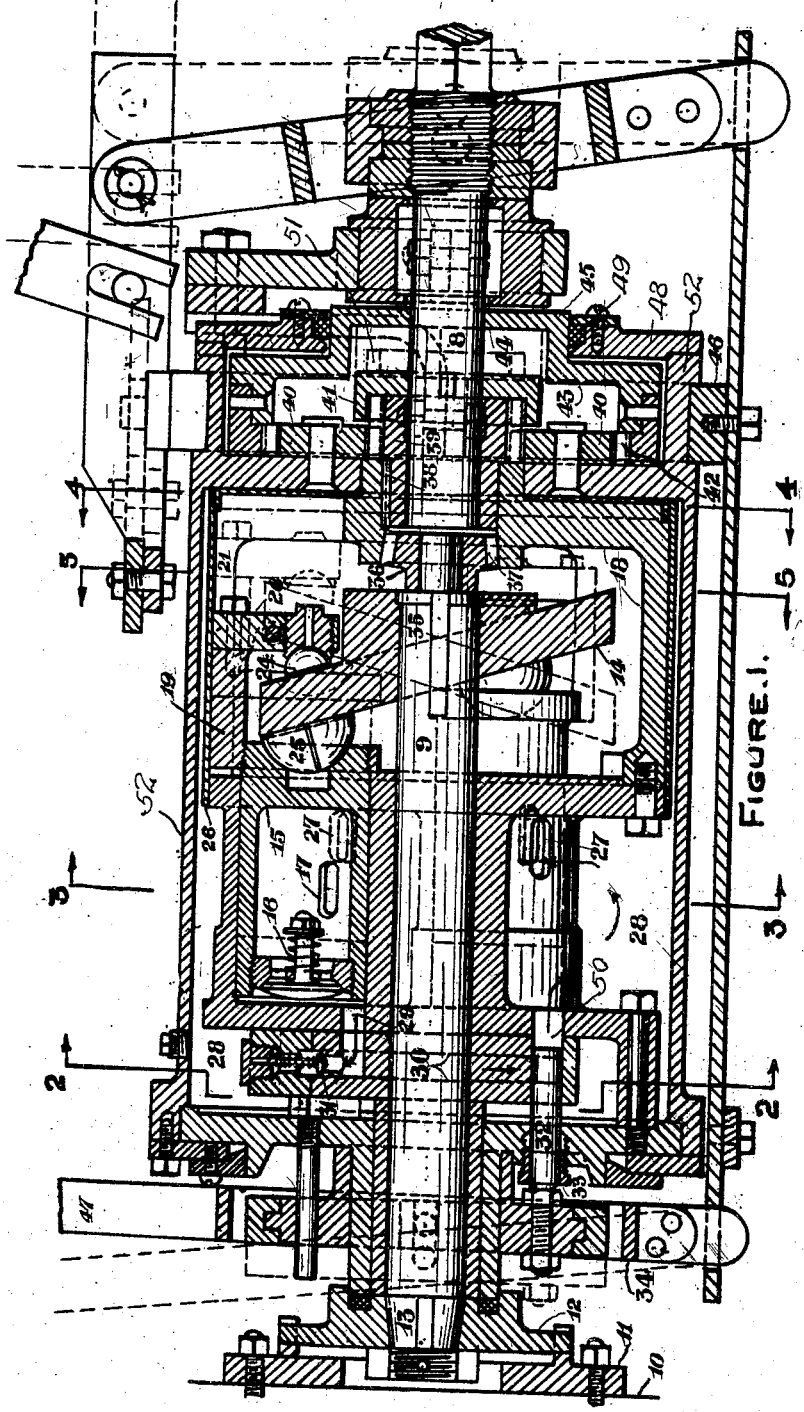

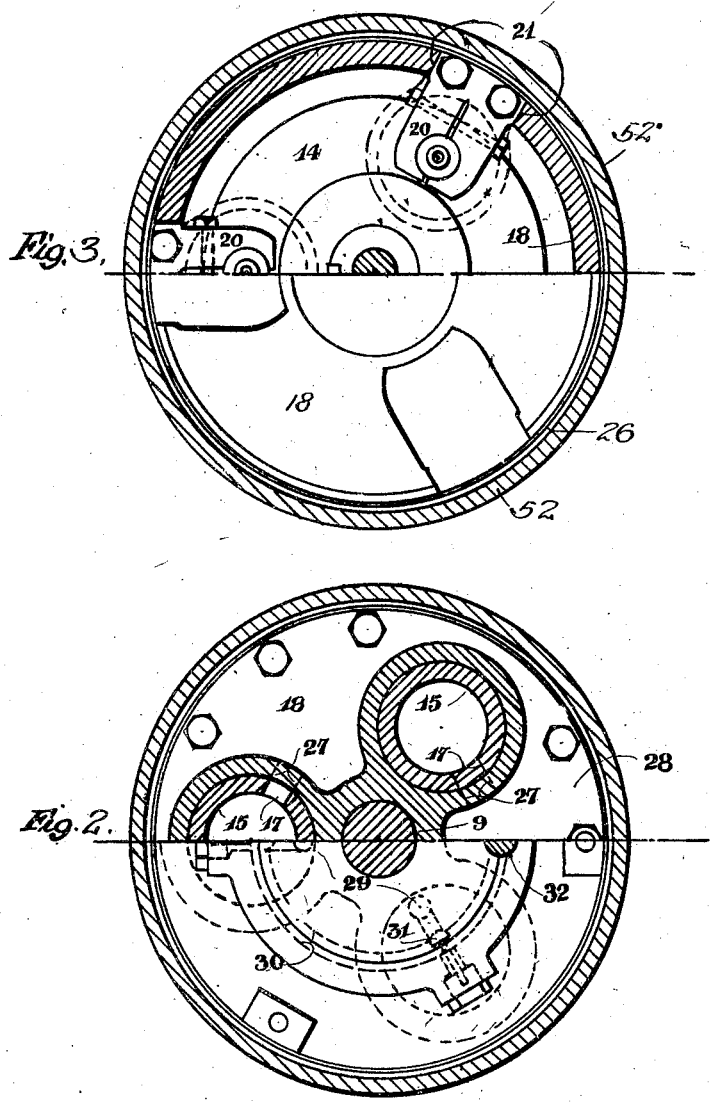

FLUID PRESSURE TRANSMISSION DEVICE

Filed June 9, 1927 3 Sheets-Sheet 3

Geo. Cassady
Inventor

Attorney.

Patented June 24, 1930

1,767,276

UNITED STATES PATENT OFFICE

GEORGE CASSADY, OF NEW WESTMINSTER, BRITISH COLUMBIA, CANADA

FLUID-PRESSURE TRANSMISSION DEVICE

Application filed June 9, 1927. Serial No. 197,773.

This invention relates to a speed changing mechanism between two separate shafts in axial alignment, such as the engine crank shaft and the drive shaft of an automotive vehicle. It belongs to that class wherein the medium through which the speed of rotation is changed is a non-compressible liquid, the flow of which is controlled through a variable aperture.

The object of the invention is to produce a mechanism of this character which is free from unnecessary complication, which in its operation has no dead point, which is silent and free from shock, and which affords any speed ratio from zero to its maximum by one controlling lever.

The invention is particularly described in the following specification, reference being made to the drawings herewith forming part of this application, in which:

Fig. 1 is a longitudinal section.

Figure 2 is a single view showing a half cross section on line 3—3 and a half cross section on line 4—4 of Fig. 1.

Figure 3 is a single view showing a half cross section on line 4—4 and a half cross section on line 5—5 of Fig. 1.

Figure 4:
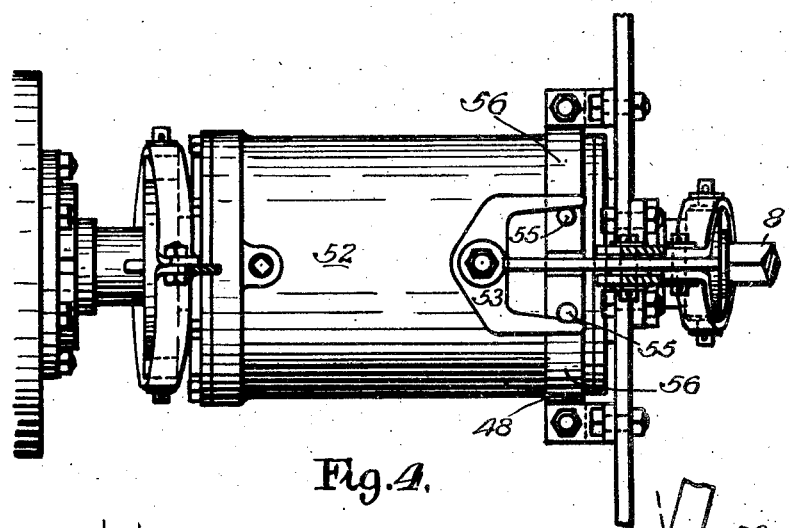
Figure 4 is a plan.
Figure 5:
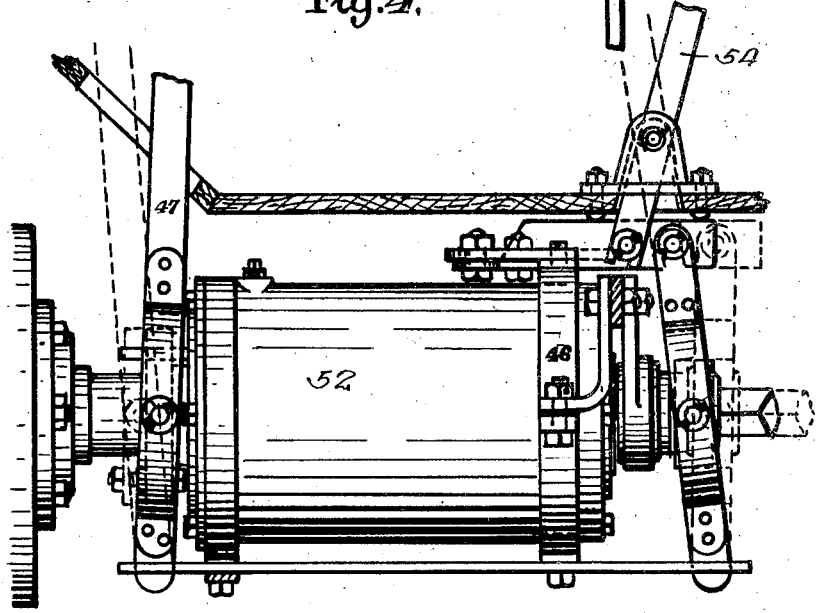
Figure 5 is a side elevation.

Taking the drawings in detail and noting that similar numerals in the different views indicate identical parts, 8 is the variable speed shaft such as the drive shaft of an automobile and 9 is the shaft directly connected to the power source, such as the engine crank shaft, 10 being the face of the fly wheel and 11 and 12 parts of a self-aligning coupling to one member of which the shaft 9 is secured by its tapered end 13. To the shaft 9 is keyed the angular smooth faced propeller 14.

Symmetrically spaced around the shaft 9 are three cylinders preferably in one block and having hollow pistons 15, each fitted with a check valve 16 and having a wall aperture or port 17. To the outer ends of the cylinders is secured a hollow annular member 18 which surrounds the periphery of the propeller 14.

A sliding member 19 is secured to the outer end of each hollow piston which member reciprocates longitudinally in one of the three recesses 21 in the member 18, the inward and radial projections 20 providing the adjustable abutment for the smaller hemispherical pivot 24 against the flat face of which the propeller 14 slides during revolution, giving to the piston 15 its return stroke.

The forward stroke of each piston is similarly produced by the operation of the propeller face against the flat surface of the larger hemispherical pivot 25. An annular plate 26 secured to the end plate 53 completes a closure to the cavity around the propeller 14 and thus retains the lubricant therein which would otherwise intermingle with the cylinder oil circulating in the cavity 28.

In the wall of each cylinder a port 27 corresponding to the piston wall port 17 permits oil to inflow from the enclosure 28 to the hollow piston as the latter takes its return stroke, the oil being discharged by the piston head through the end port 29 into the annular channel 30 by way of the small check valve 31 whence it returns to the cavity 28 by way of the regulating plunger valve 32 thus completing the circuit. The regulating valve 32 is held slidable in the guide member 33 and is connected to a control lever by the trunnion supported yoke ring 34.

At the rear extremity 35 of the engine shaft 9 an anti-friction thrust bearing 36 is secured engaging the member 18 through the inclined roller bearings 37. The motion of member 18 is imparted to the driven shaft 8 by the feather key 38 to the outside boss of the double-faced pinion 39, the teeth of the latter engaging both the four pinions 40 and the internal pinion 41 to which latter only is the shaft 8 keyed.

Concentric with the pinion 39 is the internal gear ring 42, these two members being in mesh with the four equally spaced apart pinions 40, so that when the pinions 40 revolve on their axes the direction of rotation of the gear ring 42 will be contrary to that of the pinion 39. The ring 42 is integral with the rear end oil closure member 45 which is free on the shaft 8 but carries a clutch face 44 which is engageable with a corresponding clutch face 51 on the internal tooth pinion 41. The latter pinion 41 being secured to the shaft 8 and slidable with it may be slidden out of mesh with the double faced pinion 39 and into mesh with the clutch face 44, thus releasing the shaft from the direct motion of the pinion 39 and leaving it free to take up the motion of member 45 reversed by the idler pinions 40.

The operation of the device as used for an automobile speed changing mechanism may be summarized as follows:

When the driving shaft 9 is running independently of the driven shaft 8 the angular propeller 14 reciprocates the pistons driving the oil or other fluid medium through the check valves 16 and the ports 29 through the check valves 31 into the annular chamber 30 whence it flows through the piston type control valve 32 into the cavity 28 which surrounds the cylinders, thence flowing through the apertures 27 into the hollow pistons 15 by way of the apertures 17, thus completing the circuit.

When the flow of the fluid is unrestricted by the control valve 32 the propeller slides over the flat faces of the hemispherical members 25 and 24 and the three cylinders remain in a stationary position relative to the revolving shaft.

As the flow through the control valve is restricted by movement of the lever 47 a resistance is set up between the flat faces of the hemispherical members and the surface of the propeller and the cylinders take on a slight rotary movement relative to the shaft until finally as the throttling effect of the control valve 32 is increased, the faces of the hemispherical members and that of the propeller are locked and the three cylinders revolve with the propeller and the shaft as one member, the motion being transmitted through the rear boss of the member 18 by the key on the exterior of the boss of the double-faced pinion 39 into the interior ring pinion 41, the latter being keyed to the driven shaft 8 which then has the same motion as the shaft 9, being then in the position of direct drive.

To reverse the direction of motion the ring pinion 41 secured to the driven shaft 8 is slidden back with the driven shaft so that the pinion is out of mesh and the face 51 of the pinion 41 makes a clutch contact with the corresponding clutch face of hub 45 within the recess. At the same instant the outer casing 52 is gripped by the ring brake 46 so that the motion imparted to the double-faced pinion 39 through the key 38 is reversed by the rotation of the four pinions 40 which mesh with the internal spur ring 42, causing the ring member 43 and with it the shaft 8 to revolve in the opposite direction. The ring brake 46 is contracted in diameter by the yoke piece 53 being moved longitudinally by the lever 54 causing the inclined fingers of the yoke 53 to act upon the pins 55 thereby contracting the pins 56 of the brake 46 upon the outer casing 52. Thus all of the operations throughout the whole range of forward speed and reverse are conducted gradually and entirely without shock under any condition.

What I claim as my invention and desire to secure by Letters Patent, is:

A hydraulic speed change mechanism comprising, a central and longitudinally disposed driving shaft, a flat angularly faced propeller keyed to said shaft and revolving in an oil tight enclosure, a plurality of cylinders symmetrically disposed and revolvable around the axis of said shaft, said cylinders having a common head of the nature of an end closure, the axes of said cylinders being parallel with the axis of said shaft, a cylindrical casing revolvable on said shaft and surrounding the said cylinders and the said propeller enclosure to form a second oil tight enclosure, hollow pistons slidable in said cylinders and each provided with a lateral aperture, an aperture in the wall of each said cylinder corresponding with the said piston wall aperture and adapted to intermittently register with same whereby oil may be admitted from the said second oil enclosure to the interior of the said hollow piston, a valve aperture in the head end of each of said pistons said valve aperture being closable by a spring controlled valve, hemispherical members having their flat surfaces slidably contacting the angular flat front and rear surfaces of said propeller, arcuate concave recesses in and connected with the tail ends of said hollow pistons, said arcuate recesses being adapted to oppositely engage the said hemispherical members whereby upon the revolution of the said propeller the said pistons are reciprocated in a direction parallel to the axis of the said drive shaft, an annular cavity formed in a head integral with said cylinders, an aperture connecting the said annular cavity with the said second oil enclosure, a throttle valve controlling the effective area of the last said aperture, apertures in the head ends of said cylinders connecting with valve controlled passageways leading to said annular cavity, and means controlling the operation of said throttle valve.

In testimony whereof I affix my signature.

GEORGE CASSADY.